(12) United States Patent  (10) Patent No.: US 7,695,039 B2
Sakamoto  (45) Date of Patent: Apr. 13, 2010

(54) GARNISH ATTACHMENT STRUCTURE OF VEHICLE BODY

(75) Inventor: Junichi Sakamoto, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 11/846,136

(22) Filed: Aug. 28, 2007

(65) Prior Publication Data

US 2008/0073924 A1  Mar. 27, 2008

(30) Foreign Application Priority Data

Sep. 27, 2006  (JP) .............................. 2006-262261

(51) Int. Cl.
*B60J 9/00* (2006.01)
(52) U.S. Cl. .................................................... 296/1.08
(58) Field of Classification Search ................ 296/1.08, 296/93, 29
See application file for complete search history.

(56) References Cited

U.S. PATENT DOCUMENTS

| | | | |
|---|---|---|---|
| 4,304,435 A * | 12/1981 | Everts et al. ................. | 296/213 |
| 4,417,762 A * | 11/1983 | Imai et al. ................... | 296/210 |
| 4,634,173 A * | 1/1987 | Aonuma et al. ........ | 296/203.04 |
| 4,792,180 A | 12/1988 | Jacobsen et al. | |
| 5,013,083 A * | 5/1991 | Yada et al. .................. | 296/213 |
| 7,029,060 B1 * | 4/2006 | Osterberg et al. ...... | 296/203.03 |
| 7,165,807 B2 * | 1/2007 | Wato et al. .................. | 296/210 |

FOREIGN PATENT DOCUMENTS

| | | |
|---|---|---|
| EP | 1 334 879 | 8/2003 |
| JP | 05-162591 | 6/1993 |
| JP | 08-011529 | 1/1996 |
| JP | 09-039563 | 2/1997 |
| JP | 10-006877 | 1/1998 |
| JP | 11-286214 | 10/1999 |
| JP | 2000-062458 | 2/2000 |

\* cited by examiner

*Primary Examiner*—H Gutman
(74) *Attorney, Agent, or Firm*—Rankin, Hill & Clark LLP

(57) ABSTRACT

There is provided a garnish attachment structure of a vehicle body using one of a roof garnish provided along a side part of a roof of the vehicle body and a window garnish provided along a side part of a window glass as a first garnish, and using the other as a second garnish. The garnishes are attached to a vehicle body members provided in the vehicle body. The garnish attachment structure includes: positioning locking parts that lock an end of the first garnish from an up-and-down direction and an end of the second garnish from a longitudinal forward-and-backward direction to the vehicle body member; and engaging parts that are provided at an each end of the first garnish and the second garnish and are locked to the positioning locking parts. The engaging parts are locked to the positioning locking parts, and the ends of the first garnish and the second garnish overlap each other whereby the first garnish and the second garnish are attached to the vehicle body members.

8 Claims, 5 Drawing Sheets

GARNISH ATTACHMENT STRUCTURE OF VEHICLE BODY

BACKGROUND OF THE INVENTION

1. Field of the Invention

The present invention relates to a garnish attachment structure that is mounted on a side part of the roof of a vehicle body to a side part of a window glass.

Priority is claimed on Japanese Patent Application No. 2006-262261, filed Sep. 27, 2006, the content of which is incorporated herein by reference.

2. Description of Related Art

A garnish attachment structure in which a roof garnish provided along a side part of a roof of a vehicle body and a window garnish provided along a side part of a front window glass are overlapped each other at their respective ends, and in this state, both the garnishes being attached to a vehicle body panel is known (for example, refer to Japanese Unexamined Patent Application, First Publication No. 2000-62458).

In this garnish attachment structure, the end of the second garnish is superposed on the end of the first garnish positioned in and locked to the vehicle body panel, and the second garnish in this state is positioned in and locked to the vehicle body panel.

However, in this conventional garnish attachment structure, the order in which the roof garnish and the window garnish are attached is fixed. Therefore, the attachment order cannot be changed flexibly according to the configuration of a manufacturing line. Thus, it is not possible to rapidly cope with the change of a manufacturing place, etc.

SUMMARY OF THE INVENTION

The invention has an object of providing a garnish attachment structure of a vehicle body that makes it possible to flexibly change the attachment order of the roof garnish and the window garnish.

In order to achieve the above object, the invention adopts a garnish attachment structure of a vehicle body that attaches a roof garnish provided along a side part of a roof of the vehicle body, and a window garnish provided along a side part of a window glass to a vehicle body member. One of the roof garnish and the window garnish is used as a first garnish, and the other is used as a second garnish. A positioning locking part that locks an end of the first garnish to the vehicle body member from an up-and-down direction, and that locks an end of the second garnish from a longitudinal forward-and-backward direction is provided. An end of each is provided with an engaging part that is locked to the positioning locking part. Both garnishes adopt a structure in which the engaging part is locked to the positioning locking part, and the ends of both garnishes are overlapped each other up and down and are attached to the vehicle body member.

The invention adopts a garnish attachment structure of a vehicle body that attaches a first garnish and a second garnish to the vehicle body. The garnish attachment structure includes a locking shaft that is fixed to the vehicle body and projects outward of the vehicle body, an attachment hole that is formed in the first garnish to engage the locking shaft, and a U-shaped groove that is formed in the second garnish to engage the locking shaft. The first garnish in which the attachment hole is engaged with the locking shaft, and the second garnish in which the U-shaped groove is engaged with the locking shaft are fixed to the vehicle body via the locking shaft.

As a result, when the roof garnish and the window garnish are attached to the vehicle body member, for example, the engaging part (U-shaped groove) of the roof garnish can first be engaged with the positioning locking part from the forward-and-backward direction, and thereafter, the end of the window garnish can be superposed on the upper surface of the roof garnish, and the engaging part (attachment hole) of the window garnish can be locked to the positioning locking part from above. Conversely, the engaging part (attachment hole) of the window garnish can first be locked to the positioning locking part from above, and thereafter, the engaging part (U-shaped groove) of the roof garnish can be hidden in the lower surface of the end of the window garnish from the rear, and thereby locked to the positioning locking part.

Accordingly, since the engaging part (U-shaped groove or attachment hole) of each of the roof garnish and the window garnish can be locked to the positioning locking part even if any engagement part is first locked, the attachment order of both garnishes can be flexibly changed according to the configuration of a manufacturing line, etc.

In the garnish attachment structure of a vehicle body as described above, the positioning locking part may include a locking shaft that is fixed to the vehicle body member and project upward thereof, and a male thread provided so as to project from an end face of the locking shaft via a stepped part. The locking shaft may lock the engaging parts of the first garnish and the second garnish, and may be formed so as to have the same height as the thickness of when the end of the first garnish and the end of the second garnish to overlap each other. A nut may be screwed into the male thread in which the end of the first garnish and the end of the second garnish are locked to the locking shaft.

The garnish attachment structure of a vehicle body may further include a male thread that projects from a tip of the locking shaft, and has a smaller diameter than the locking shaft; and a female thread member that is screwed into the male thread, and the projection height of the locking shaft may be almost the same as the total of the thickness of the first garnish around the attachment hole and the thickness of the second garnish around the U-shaped groove.

In this case, when both garnishes overlap each other after the engaging part of both garnishes has been locked to the locking shaft, and in this state, the nut is screwed into the male thread, the ends of both garnishes are fixed to the vehicle body member. At this time, since the height of the locking shaft is set to be the same as the thickness of when both garnishes overlap each other, an excessive fastening load will not act on an overlapping part of both the garnishes.

Accordingly, the work can be performed without taking any notice of the fastening load of the nut, and assembling workability improves.

In the garnish attachment structure of a vehicle body as described above, the second garnish and the positioning locking part may be provided with stopper parts that regulate the forward-and-backward traveling of the second garnish locked to the positioning locking part.

The garnish attachment structure of a vehicle body as described above may further include a locating projection that is provided in one of the second garnish and the vehicle body; and a locking hole that is provided in the other one of the second garnish and the vehicle body, and engages the locating projection.

In this case, since the forward-and-backward traveling of the second garnish is regulated by the stopper parts (locating projection and locking hole), the other garnish can be accurately positioned in the forward-and-backward direction.

Accordingly, the attaching accuracy of the second garnish can be improved, and assembling workability can be improved.

In the garnish attachment structure of a vehicle body as described above, at least one of the first garnish and the second garnish may be provided with a reinforcing member that has a shape along the shape of the engaging part.

The garnish attachment structure of a vehicle body as described above may further include a reinforcing member that is provided in the second garnish and is formed with a U-shaped groove having the same shape as the U-shaped groove.

In this case, the engaging part (U-shaped groove) is reinforced by the reinforcing member, and deformation of the engaging part is prevented.

Accordingly, the attaching accuracy of the garnishes can be improved, and assembling workability can be improved.

BRIEF DESCRIPTION OF THE REFERENCE

Figure 1:
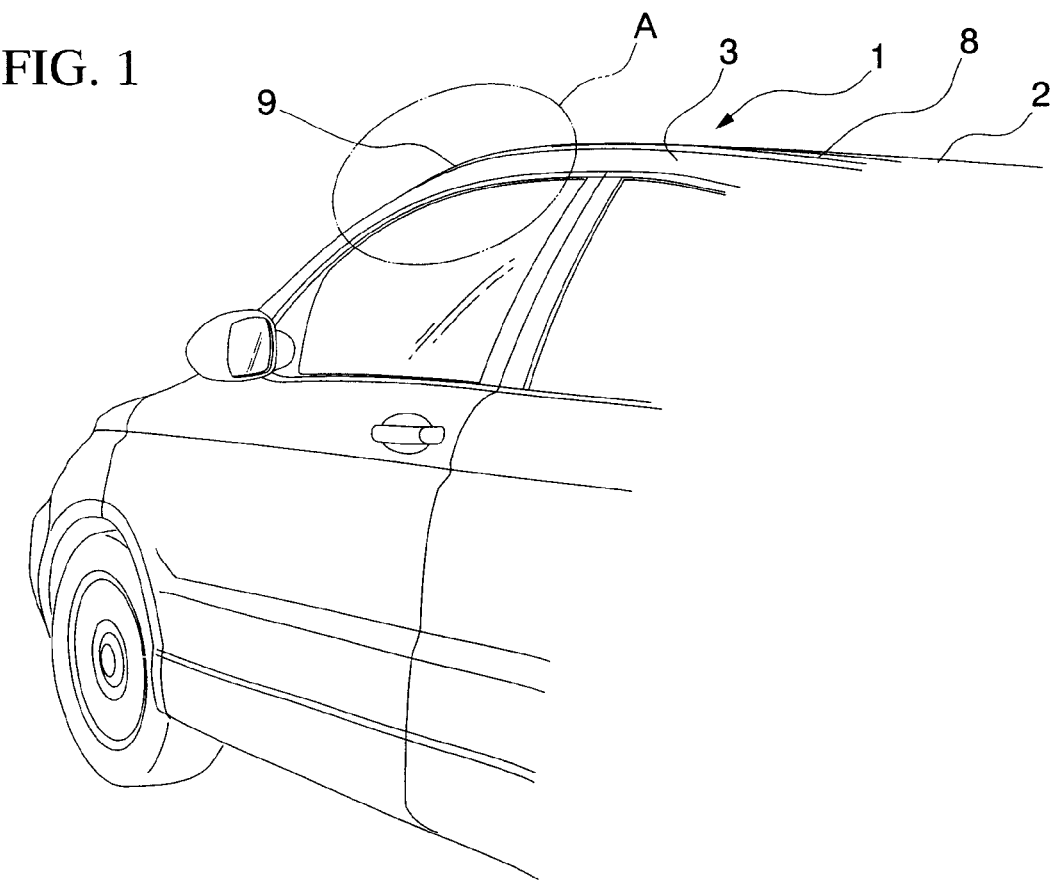
FIG. 1 is a perspective view of a vehicle body showing one embodiment of the present invention.

1: vehicle body
2: roof panel (vehicle body member)
3: roof side panel (vehicle body member)
4: front window glass (window glass)
5: front pillar panel (vehicle body member)
8: roof garnish
9: window garnish
11: base member (positioning locking part)
12: stepped bolt (positioning locking part)
13: locking shaft
14: stepped part
15: male thread
16: locking hole (stopper part)
18: core (reinforcing member)
20: U-shaped groove (engaging part)
21: locating projection (stopper part)
24: attachment hole (engaging part)
30: nut (female thread member)

DETAILED DESCRIPTION OF THE INVENTION

Hereinafter, one embodiment of the present invention will be described with reference to the accompanying drawings. In addition, in the following description, unless particularly limited, "forward" and the "backward" mean forth and back in the traveling direction of a vehicle body, and the "up" and the "down" mean up and down in the vertical direction.

Figure 2:
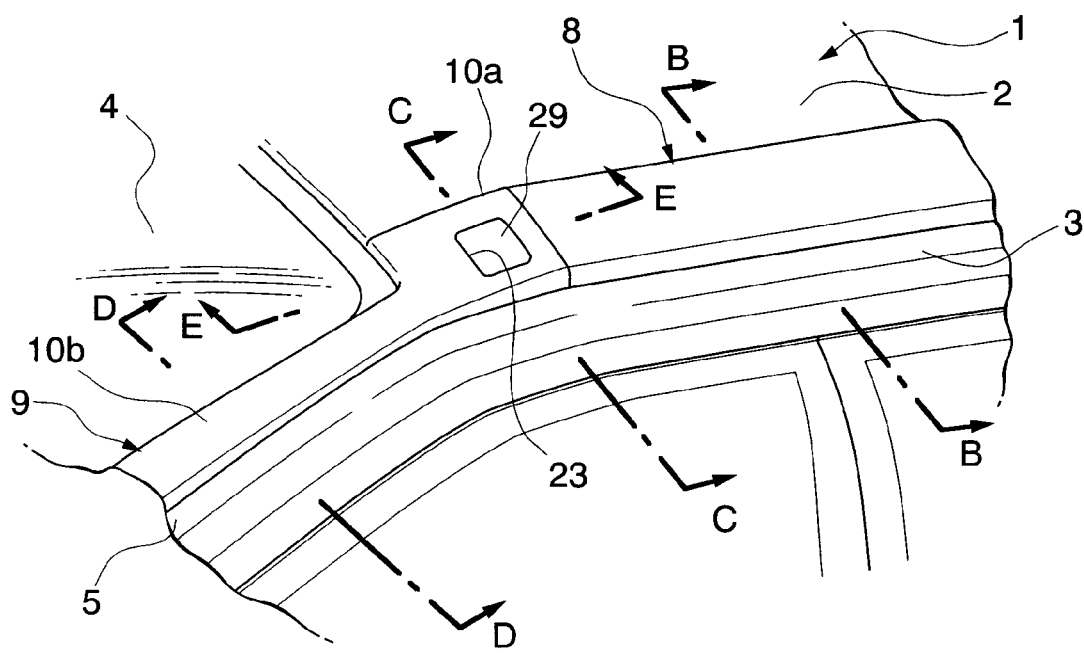
FIG. 2 is an enlarged perspective view of the section A of FIG. 1.

FIG. 1 is a perspective view of a vehicle body 1 adopting the present invention. FIG. 2 is an enlarged perspective view of the section A of FIG. 1. In these drawings, reference numeral 2 denotes a roof panel provided in a roof part of the vehicle body 1, reference numeral 3 denotes a roof side panel combined with a side part of the roof panel 2 in the width direction of the vehicle, reference numeral 4 denotes a front window glass arranged in front of the roof panel 2, and reference numeral 5 denotes a front pillar panel provided continuously with the front side of the roof side panel 3 to support a side part of the front window glass 4.

Figure 3:
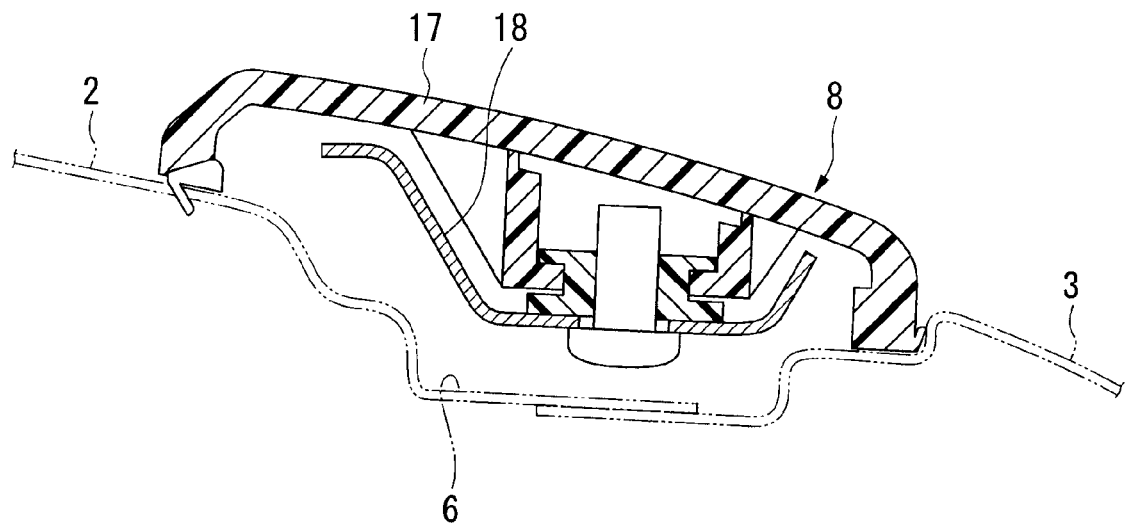
FIG. 3 is a sectional view along the line B-B of FIG. 2.
Figure 4:
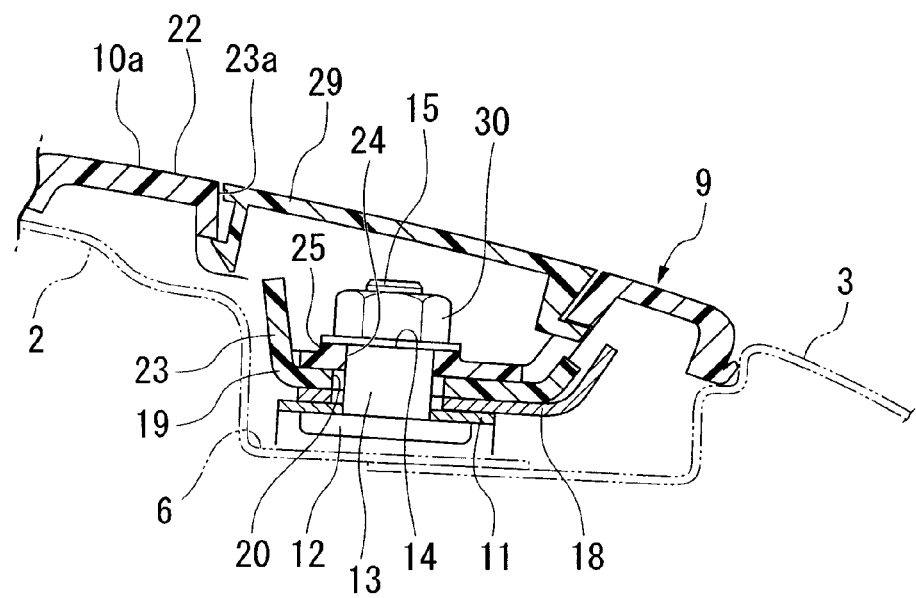
FIG. 4 is a sectional view along the line C-C of FIG. 2.

FIG. 3 is a sectional view along the line B-B of FIG. 2. FIG. 4 is a sectional view along the line C-C of FIG. 2. As shown in these drawings, a junction between the roof panel 2 and the roof side panel 3 is bent in a stepped shape and projects into a vehicle room. The junction between the roof panel 2 and the roof side panel 3 is formed with a junction groove 6 having a substantially U-shaped cross-section along the longitudinal direction of the vehicle body.

Figure 5:
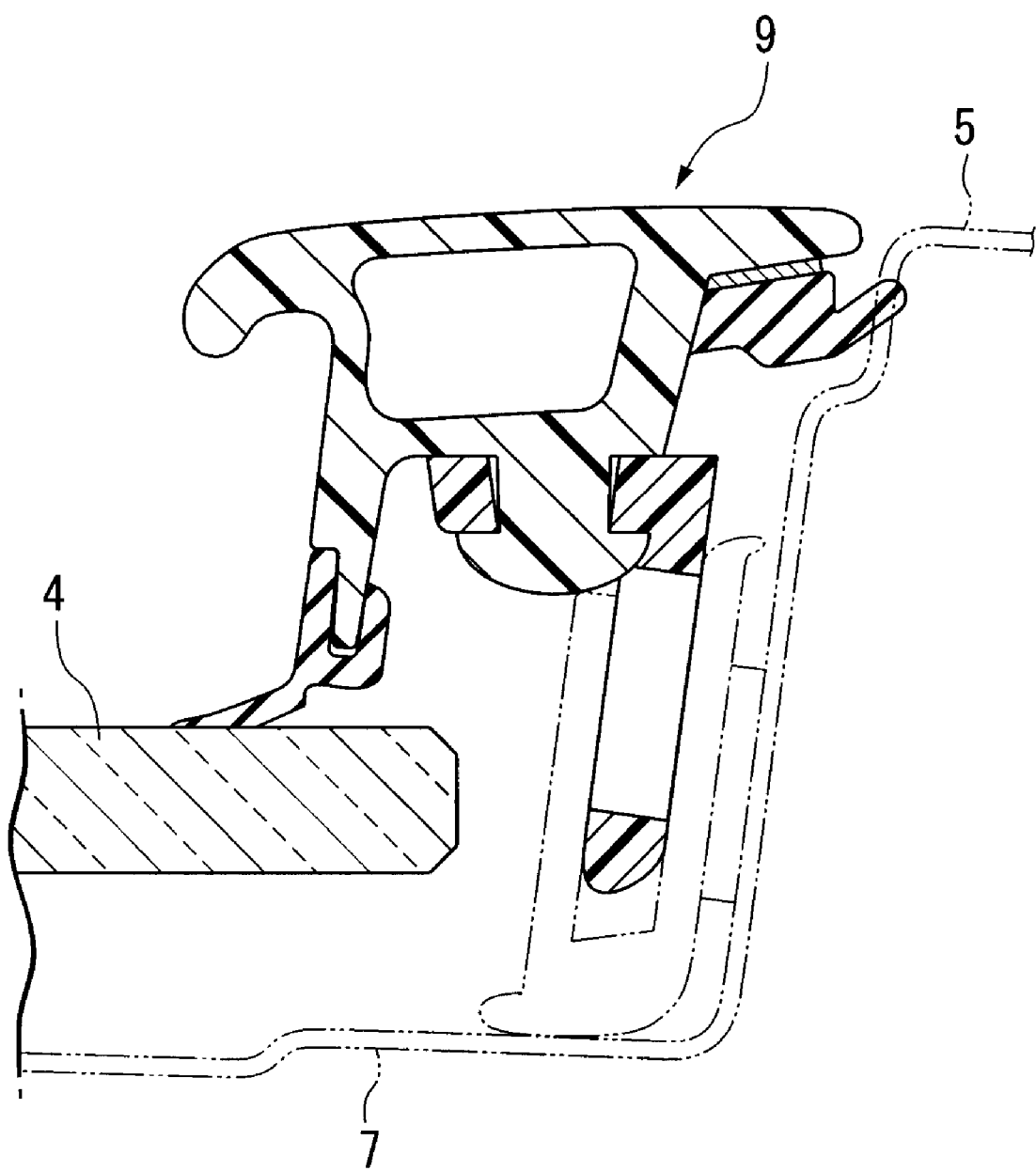
FIG. 5 is a sectional view along the line D-D of FIG. 2.

FIG. 5 is a sectional view along the line D-D of FIG. 2. As shown in FIG. 5, an inner edge of the front pillar panel 5 that is formed continuously with a front part of the roof side panel 3 extends in the width direction of the vehicle, and is bent in the shape of the letter "L" to form a glass support 7. The glass support 7 is a part that is depressed in a stepped shape from the part of the front pillar panel 5 exposed to the outside of the vehicle, and a side edge of the front window glass 4 is fixedly supported by this part.

A long roof garnish 8 made of resin is attached to the junction groove 6 of the roof of the vehicle body. A window garnish 9 made of resin along a side part of the front window glass 4 is attached to the glass support 7 of the front pillar panel 5. The whole roof garnish 8 is formed so as to have a nearly definite width. The window garnish 9, as shown in FIG. 2, has a rear end region 10a formed so as to have the same width as the roof garnish 8 and connected with the roof garnish 8, and a general region 10b located in front of the rear end region 10a and formed so as to be narrower than the width of the roof garnish 8. The rear end region 10a of the window garnish 9 is fixedly positioned in a vehicle body member along with the front end of the roof garnish 8 at a front end of the junction groove 6 of the roof of the vehicle body.

Figure 6:
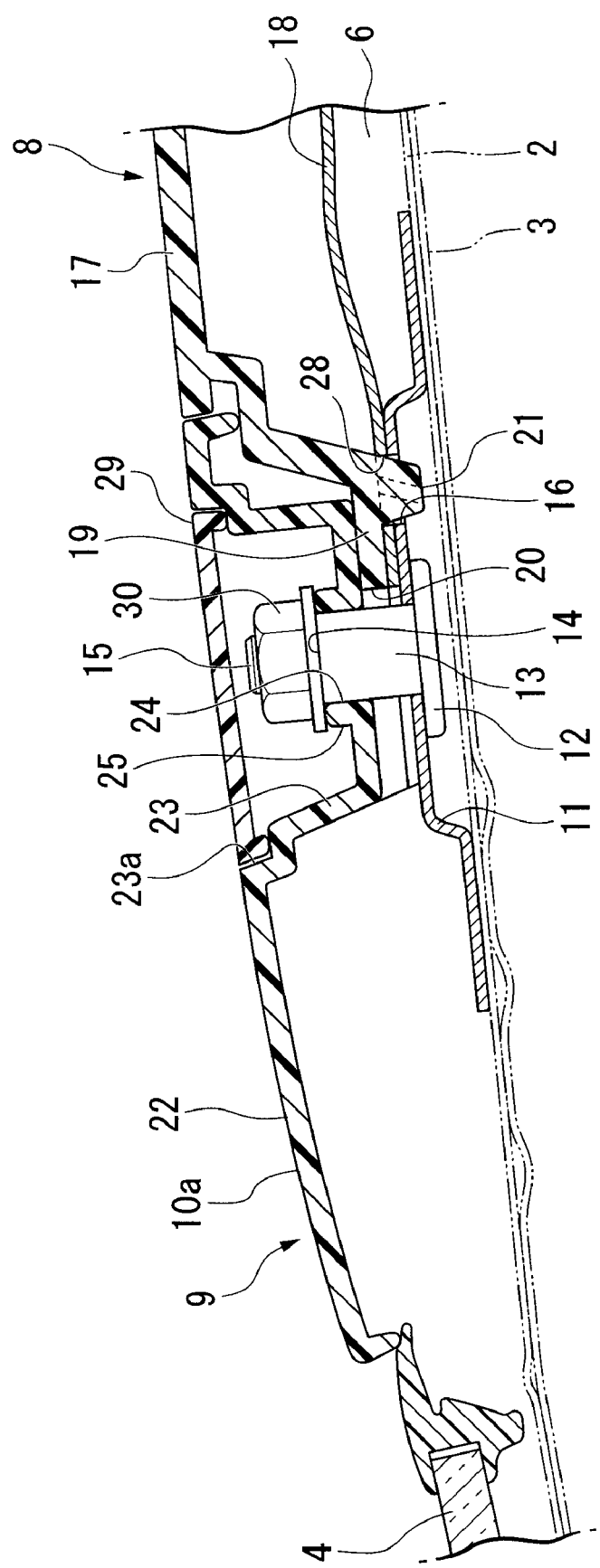
FIG. 6 is a sectional view along the line E-E of FIG. 2.
Figure 7:
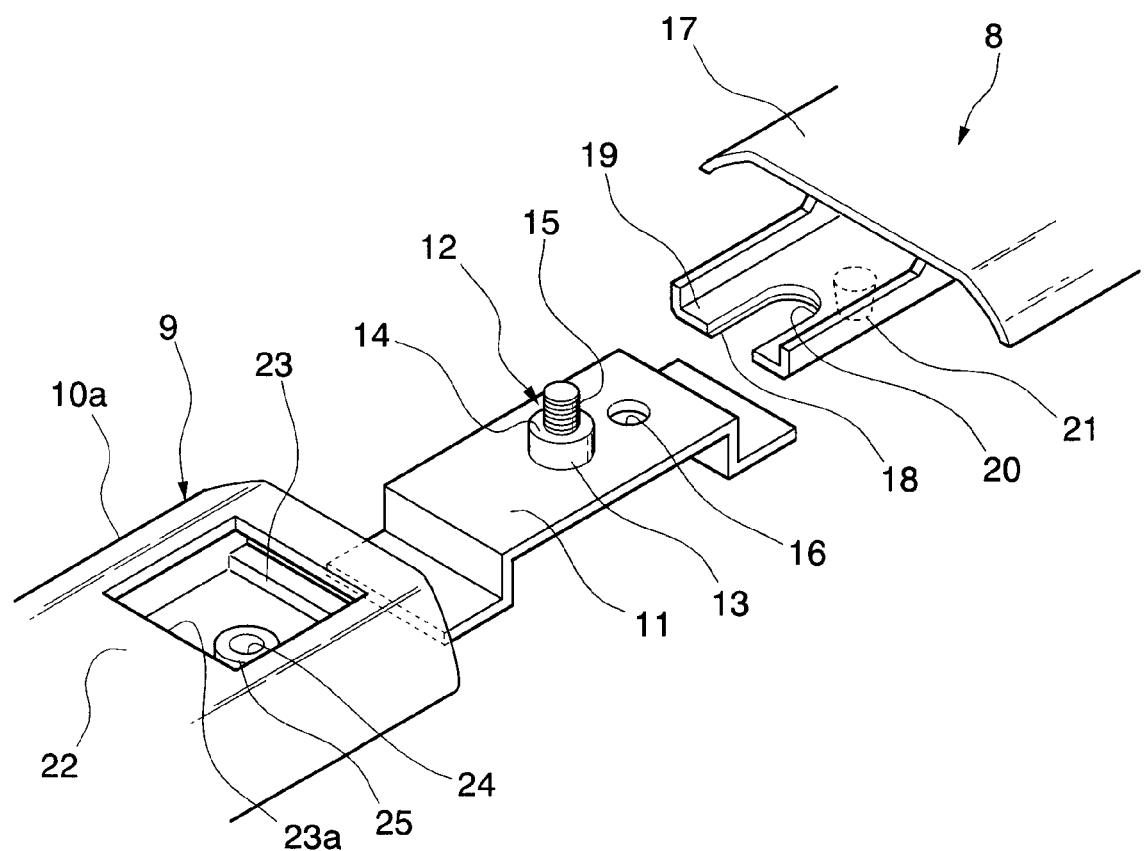
FIG. 7 is an exploded perspective view showing principal parts of FIG. 2.

FIG. 6 is a sectional view along the line E-E of FIG. 2. FIG. 7 is an exploded perspective view of the junction between the roof garnish 8 and the window garnish 9. As shown in these drawings, a base member 11 including a welding fixed part 11a welded to the vehicle body and a bolt support 11b supported by the welding fixed part 11a is fixedly welded to the front end of the junction groove 6. A stepped bolt 12 is fixed to the center of the bolt support 11b. The stepped bolt 12 includes a cylindrical locking shaft 13 that projects upward from the base member 11 (bolt support 11b), and an male thread 15 that projects upward from an upper end of the locking shaft 13 via a stepped part 14. An end of the roof garnish 8 and an end of the window garnish 9 are locked by the locking shaft 13. The projection height of the locking shaft 13 from the base member 11 is the same as the thickness of when the end of the roof garnish 8 and the end of the window garnish 9 overlap each other. A locking hole 16 for regulating the positional deviation of a front edge of the roof garnish 8 is formed in a position separated from the fixed position of the stepped bolt 12 of the base member 11 towards the rear of the vehicle body. In the present embodiment, the base member 11 and the stepped bolt 12 constitute a positioning locking part.

The roof garnish 8, as shown in FIGS. 3 and 6, has a garnish body part 17 exposed upward of the junction groove 6, and a plate-like core 18 that is a reinforcing member provided on the backside of the garnish body part 17. A connecting piece 19 having a substantially U-shaped cross-section and extending forward is formed on a lower surface of a front end of the garnish body part 17. A tip of the connecting piece 19 is formed with a U-shaped groove 20 that can be engaged with the locking shaft 13 of the stepped bolt 12 from a direction perpendicular to the shaft (from the rear side of the vehicle body). A locating projection 21 (stopper part) located on an extension line of the center of width of the U-shaped groove 20 is formed on the lower surface of the connecting piece 19. The locating projection 21 can be fitted into the locking hole 16 of the base member 11. The core 18 that reinforces the garnish body part 17 extends forward along the lower surface of the connecting piece 19, and the tip of the core has a shape extending along the edge of the U-shaped groove 20 of the connecting piece 19. In other words, the tip of the core 18 is formed with a U-shaped groove having the same shape as the U-shaped groove 20 of the connecting piece 19. Accordingly, the tip of the core 18 reinforces the edge of the U-shaped groove 20. The core 18 is formed with a through hole 28 through which the locating projection 21 passes. The locating projection 21 projects below the core 18 through the through hole 28.

As shown in FIGS. 6 and 7, a concave part 23 is provided in the broad rear end region 10a of the window garnish 9 so as to form an oblong opening 23a of rectangular shape in the surface of the garnish body part 22 exposed upward of the junction groove 6. An attachment hole 24 that can be fitted to the locking shaft 13 of the stepped bolt 12 is formed almost in the central part of a bottom wall in the concave part 23, and a boss 25 that projects upward is provided at a peripheral edge of the attachment hole 24. After the U-shaped groove 20 of the roof garnish 8 and the attachment hole 24 of the window garnish 9 are locked by the locking shaft 13, a nut (female thread member) 30 is screwed into the male thread 15 of the stepped bolt 12 that has passed through the attachment hole 24, as shown in FIGS. 4 and 6. The end of the roof garnish 8 and the end of the window garnish 9 are fixedly positioned in the vehicle body by fastening of the nut 30 in a state where they are caused to overlap each other. After the nut 30 is fastened, a cover member 29 is attached to the opening 23a of the concave part 23.

In the garnish attachment structure of the present embodiment, even when either the roof garnish 8 or the window garnish 9 is attached in advance, both the garnishes 8 and 9 can be easily and accurately attached to the vehicle body.

For example, when the roof garnish 8 is attached in advance, first, the U-shaped groove 20 of the connecting piece 19 of the front end of the roof garnish 8 is fitted to the locking shaft 13 of the stepped bolt 12 on the base member 11 from the rear side of the vehicle body. In this state, the locating projection 21 on the rear surface of the connecting piece 19 is fitted into the locking hole 16 in the base member 11. Next, with the front end of the roof garnish 8 being positioned, other parts of the roof garnish 8 are fixed within the junction groove 6 with a clip or a bolt.

Thereafter, the attachment hole 24 of the rear end region 10a of the window garnish 9 is fitted to the locking shaft 13 of the stepped bolt 12 from above. When the attachment hole 24 is fitted to the locking shaft 13 of the stepped bolt 12, the rear end region 10a of the window garnish 9 is positioned in the vehicle body, and is overlapped on the tip of the connecting piece 19 of the roof garnish 8.

Next, with the rear end region 10a of the window garnish 9 being positioned, other parts of the window garnish 9 are fixed to the front pillar panel 5 by clipping, etc. Moreover, the part that is obtained by overlapping the window garnish 9 and the roof garnish 8 is fixed to the vehicle body by screwing the nut 30 into the male thread 15 of the stepped bolt 12.

Conversely, when the window garnish 9 is assembled in advance, the attachment hole 24 of the rear end region 10a of the window garnish 9 is fitted to the locking shaft 13 of the stepped bolt 12 from above. Next, with the rear end region 10a being positioned and locked, other parts of the window garnish 9 are fixed to the front pillar panel 5 by clipping, etc.

Thereafter, the U-shaped groove 20 of the connecting piece 19 of the roof garnish 8 is hidden in the lower surface of the rear end region 10a of the window garnish 9 and is fitted to the locking shaft 13 of the stepped bolt 12 from the rear side of the vehicle body, and the locating projection 21 on the rear surface of the connecting piece 19 is fitted into the locking hole 16 of the base member 11. Next, other parts of the roof garnish 8 are fixed within the junction groove 6 with a clip or a bolt. The nut 30 is screwed into the male thread 15 of the stepped bolt 12, and the overlapping part of both the garnishes 8 and 9 is fixed to the vehicle body.

As described above, in the case of this garnish attachment structure, even if the order in which the roof garnish 8 and the window garnish 9 are attached is changed, they can be attached to a vehicle body without any problem. Therefore, the order in which both the garnishes 8 and 9 are attached can be changed flexibly according to a manufacturing line. For this reason, it is possible to rapidly cope even with a change in the place of manufacture, etc.

Further, in the present embodiment, the overlapping part of the roof garnish 8 and the window garnish 9 is fixed to the stepped bolt 12 by fastening of the nut 30. However, since the height of the locking shaft 13 of the stepped bolt 12 that is locked in a state in which the ends of both garnishes 8 and 9 overlap each other is set the same as the thickness of when both garnishes 8 and 9 overlap each other, assembling work can be safely and efficiently performed without any fear that the overlapping part of both garnishes 8 and 9 is fastened by excessive force.

Moreover, in the present embodiment, the locating projection 21 is provided so as to protrude from the lower surface of the connecting piece 19 of the roof garnish 8, and the locking hole 16 into which the locating projection 21 is fitted is formed in the base member 11. Therefore, when the roof garnish 8 is moved to the front, thereby causing the U-shaped groove 20 to engage the locking shaft 13, the position of the roof garnish 8 in the forward-and-backward direction can be positioned easily and accurately. Particularly if the locating projection 21 is made relatively easily deformable structure, the locating projection 21 can be surely fitted into the locking hole 16 even when the connecting piece 19 of the roof garnish 8 is hidden in the lower surface of the rear end region 10a of the window garnish 9.

Further, in the present embodiment, the edge of the U-shaped groove 20 of the connecting piece 19 of the roof garnish 8 is reinforced by the core 18. Therefore, deformation of the U-shaped groove 20 at the time of positioning can be reliably prevented, and the positioning accuracy of the roof garnish 8 and the assembling workability can be improved.

In addition, the invention is not limited to the above embodiment, and various design changes can be made without departing from the scope thereof. For example, although the above embodiment has been described in that the front end of the roof garnish 8 is engaged with the locking shaft 13 from the forward-and-backward direction and the rear end of the window garnish 9 is engaged with the locking shaft 13 from the up-and-down direction. However, contrary to this, the front end of the roof garnish may be engaged with the locking shaft from the up-and-down direction, and the rear end of the window garnish may be engaged with the locking shaft from the forward-and-backward direction.

What is claimed is:

1. A garnish attachment structure of a vehicle body using one of a roof garnish provided along a side part of a roof of the vehicle body, and a window garnish provided along a side part of a window glass as a first garnish, and using the other one of the roof garnish and the window garnish as a second garnish, and attached to a vehicle body member provided in the vehicle body, the garnish attachment structure comprising:

a positioning locking part that locks an end of the first garnish to the vehicle body member from an up-and-down direction, and that locks an end of the second garnish from a longitudinal forward-and-backward direction, the positioning locking part includes a locking shaft fixed to the vehicle body such that the locking shaft projects upward away from the vehicle body; and an engaging part that is provided at an end of each of the first garnish and the second garnish, and is locked to the positioning locking part, wherein the engaging part is locked to the positioning locking part, and the ends of the first garnish and the second garnish overlap each other whereby the first garnish and the second garnish are fixed on the vehicle body via the locking shaft by a thread connection.

2. The garnish attachment structure of a vehicle body according to claim 1, wherein a male thread projects from an end face of the locking shaft via a stepped part; the locking shaft locks the engaging parts of the first garnish and the second garnish and is formed so as to have the same height as the thickness of when the end of the first garnish and the end of the second garnish overlap each other; and a nut is screwed into the male thread in which the end of the first garnish and the end of the second garnish are locked to the locking shaft.

3. The garnish attachment structure of a vehicle body according to claim 1, wherein the second garnish and the positioning locking part are provided with stopper parts that regulate the forward-and-backward travel of the second garnish locked to the positioning locking part.

4. The garnish attachment structure of a vehicle body according to claim 1, wherein at least one of the first garnish and the second garnish is provided with a reinforcing member that has a shape profiling the shape of the engaging part.

5. A garnish attachment structure of a vehicle body that attaches a first garnish and a second garnish to the vehicle body, the garnish attachment structure comprising:

a locking shaft fixed to the vehicle body such that the locking shaft projects upward away from the vehicle body;

an attachment hole that is formed in the first garnish to engage the locking shaft; and a U-shaped groove that is formed in the second garnish to engage the locking shaft, wherein the first garnish in which the attachment hole is engaged with the locking shaft, and the second garnish in which the U-shaped groove is engaged with the locking shaft are fixed on the vehicle body via the locking shaft by a thread connection.

6. The garnish attachment structure of a vehicle body according to claim 5, further comprising:

a male thread that projects from a tip of the locking shaft and has a smaller diameter than the locking shaft; and a female thread member that is screwed into the male thread, wherein the projection height of the locking shaft is almost the same as the total of the thickness of the first garnish around the attachment hole and the thickness of the second garnish around the U-shaped groove.

7. The garnish attachment structure of a vehicle body according to claim 5, further comprising:

a locating projection provided in the second garnish; and a locking hole provided in the vehicle body and engages the locating projection.

8. The garnish attachment structure of a vehicle body according to claim 5, further comprising a reinforcing member that is provided in the second garnish and is formed with a U-shaped groove having the same shape as the U-shaped groove of the second garnish.

* * * * *